(12) United States Patent  
Sanfilippo (10) Patent No.: US 6,260,008 B1  
(45) Date of Patent: Jul. 10, 2001

(54) METHOD OF AND SYSTEM FOR DISAMBIGUATING SYNTACTIC WORD MULTIPLES

(75) Inventor: Antonio Pietro Sanfilippo, Cowley (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/004,480

(22) Filed: Jan. 8, 1998

(51) Int. Cl.$^7$ .............................. G06F 17/27; G06F 15/00
(52) U.S. Cl. .................................. 704/9; 707/530
(58) Field of Search ..................... 704/1, 9, 10; 707/530, 707/531

(56) References Cited

U.S. PATENT DOCUMENTS

| | | | |
|---|---|---|---|
| 4,661,924 | | 4/1987 | Okamoto et al. ..................... 364/900 |
| 5,146,405 | * | 9/1992 | Church ..................................... 704/9 |
| 5,243,520 | * | 9/1993 | Jacobs et al. ............................ 704/9 |
| 5,406,480 | | 4/1995 | Kanno ............................. 364/419.08 |
| 5,541,836 | * | 7/1996 | Church et al. ........................... 704/9 |
| 5,652,898 | * | 7/1997 | Kaji ......................................... 704/1 |
| 5,794,050 | * | 8/1998 | Dahlgren ................................. 704/9 |
| 5,878,386 | * | 3/1999 | Coughlin ................................. 704/9 |

FOREIGN PATENT DOCUMENTS

| | | | |
|---|---|---|---|
| 0494573 | 7/1992 | (EP) | ............................... G06F/15/38 |
| 0550160 | 7/1993 | (EP) | ............................... G06F/15/38 |

OTHER PUBLICATIONS

Search Report for European Patent Office Application No. 98300147.0; Dated Mar. 30, 1998.

P. Resnick, IJCAI–95, Proceedings of the 14$^{th}$ International Joint Conference On Artificial Intelligence, vol. 1, 20–25, Aug. 1995, Montreal, Que, CA, pp. 448–452, Using Information Content to Evaluate Semantic Similarity in a Taxonomy.

M. Sussna, CIKM–93, Proceedings of the Second International Conference On Information and Knowledge Management, Nov. 1–5, 1993, Washington, DC, US, pp. 67–74, "Word Sense Disambiguation For Free–Text Indexing Using A Massive Semantic . . . ".

Search Report for Application No. GB 9700338.8; Dated Feb. 21, 1997.

P. Resnik, Proceedings of the Third Workshop on Very Large Corpora, pp. 54–68, "Disambiguating Noun Groupings With Respect To Wordnet Senses".

R. Beckwith et al., Lexical Acquisition: Exploiting On–Line Resources To Build A Lexicon, pp. 211–232, 1991, "Wordnet: A Lexical Database Organized On Psycholinguistic Principles".

P. Resnik, Proceeding to IJCAI–95, 1995, "Using Information Content To Evaluate Semantic Similarity In A Taxonomy".

N. Abramson, Information Theory And Coding, pp. 6–13, 1963.

\* cited by examiner

Primary Examiner—Forester W. Isen
Assistant Examiner—Patrick N. Edouard
(74) Attorney, Agent, or Firm—Renner, Otto, Boisselle & Sklar (57) ABSTRACT

A method and system are provided for disambiguating multiples of syntactically related words automatically using the notion of semantic similarity between words. Based on syntactically related words derived from a sample text, a set is formed containing each associating word and the words associated in the syntactic relationship with it. The associating words are expanded to all word senses. Pair wise intersections of the resulting sets are formed so as to form pairs of semantically compatible word clusters which may be stored as pairs of cooccurrence restriction codes.

9 Claims, 6 Drawing Sheets

METHOD OF AND SYSTEM FOR DISAMBIGUATING SYNTACTIC WORD MULTIPLES

BACKGROUND OF THE INVENTION

1. Field of the Invention

The present invention relates to a method of and a system for disambiguating syntactic word multiples, such as pairs of words, which may be collocates (i.e. words frequently used together). Such a method and system may be used in natural language processing (NLP), for instance for assisting in machine translation between languages.

2. Description of the Related Art

The term "disambiguating" when applied to a word (or group of words) means clarifying the meaning of the word (or group) with reference to the context in which the word (or group) occurs. For example, the verb "fire" can be used to describe a shooting act, such as "fire pistol", or the act of dismissal from employment, such as "fire employee". Disambiguating the verb "fire" in "fire pistol" would comprise clarifying that the verb is used in the "shooting" sense.

It is known in NLP systems to provide syntactic analysis whereby a "parser" analyses input or stored text into the different "parts of speech". However, in natural languages, the same word with the same spelling and part of speech can have different meanings according to the context in which it occurs. For example, as described above, the verb "fire" describes a shooting act in the context of "fire pistol" and an act of dismissal from employment in the context of "fire employee". In such cases, syntactic analysis as available through conventional parsers is unable to clarify the meaning of words in context. There is therefore a need for "word disambiguation" in order to complement syntactic analysis in NLP systems.

A first step in word disambiguation may be performed by clustering word senses in terms of semantic similarity. Word senses may, for instance, be found in electronic dictionaries and thesauri. Semantic similarity can be assessed from electronic thesauri where synonymic links are disambiguated i.e. each synonymic link relates specific word senses.

Words are said to be "semantically similar" or "semantically congruent" if their meanings are sufficiently close. Closeness in meaning may be established in terms of equivalance or compatibility of usage. For example, the words "gun" and "pistol" are very close in meaning because they can be used to describe the same object. Similarly, the words "ale" and "beer" are very close in meaning because the first is a specific instance of the second i.e. "ale" is a type of "beer". The notion of semantic similarity can also be used in a relative sense to express the degree to which words are close in meaning. In this case, there may be no equivalence or compatibility in meaning. For example, there is a clear sense in which "doctor" and "nurse" are closer in meaning than "doctor" and "computer". Although "doctor" and "nurse" are neither equivalent nor compatible in meaning because they describe distinct professions, they both refer to a person who is trained to attend sick people. The words "doctor" and "computer" share little else beyond the fact that both refer to concrete entities. In this case, the specificity of the shared concept (for instance "person who is trained to attend sick people" versus "concrete entity") determines the relative semantic similarity between words.

There are several known techniques for finding semantic similarity between two words using machine readable thesauri. Examples of such techniques are disclosed in European Patent Application No. 91480001.6 and in papers published by Resnik in 1995 entitled "Using Information Content to Evaluate Semantic Similarity in a Taxonomy" (IJCAI-95) and "Disambiguating Noun Groupings with Respect to WordNet Senses" (third workshop on very large corpora, Association for Computational Linguistics). The techniques disclosed by Resnik make use of the WordNet Lexical Database disclosed by Beckwith et al, 1991, "WordNet: A Lexical Database Organised on Psycholinguistic Principles" in Lexical Acquisition, LEA, Hillsdale, N.J.

Resnik defines the semantic similarity between two words as the "entropy" value of the most informative concept subsuming or implied by the two words. This assessment is performed with reference to a lexical database such as WordNet mentioned hereinbefore, where word senses are hierarchically arranged in terms of subsumption links. For example, all senses of the nouns "clerk" and "salesperson" in WordNet are connected to the first sense of the nouns "employee", "worker", "person" so as to indicate that "clerk" and "salesperson" are a kind of "employee" which is a kind of "worker" which in turn is a kind of "person". In this case, the semantic similarity between the words "clerk" and "salesperson" would correspond to the entropy value of "employee", which is the most informative (i.e. most specific) concept shared by the two words.

The informative content (or Entropy) of a concept c (such as a set of synonymic words such as fire, dismiss, terminate, sack) is formally defined as:

$$-\log p(c)$$

where p is the probability of c. The probability of c is obtained for each choice of text sample or collection K by dividing the frequency of c in K by the total number W of words which occur in K and which have the same part of speech as the word senses in c. This may be expressed as:

$$p(c_{pos}) = (\text{freq}(c_{pos}))/(w_{pos})$$

where pos specifies the same part of speech. The frequency of a concept is calculated by counting the occurrences of all words which are an instance of (i.e. subsumed by) the concept: every time that a word w is encountered in K, the count of all concepts subsuming w is increased by one. This may be expressed as:

$$\text{freq}(c) = \sum_{W \in \text{words}(c)} \text{count}(W)$$

The semantic similarity between two words W1 and W2 is expressed as the entropy value of the most informative concept c which subsumes both W1, W2:

$$sim(W1, W2) = _{c \in \{x \, \wedge subsumes(x, W1)} \max_{\wedge subsumes(x, W2)\}} [-\log p(c)]$$

The specific senses of W1, W2 under which semantic similarity holds can be determined with respect to the subsumption relation linking c with W1, W2. For instance, if it is found that, in calculating the semantic similarity of the two verbs "fire" and "dismiss" using the WordNet lexical database, the most informative subsuming concept is represented by the synonym set containing the word sense remove_v_2, then it is known that the senses for "fire" and "dismiss" under which the similarity holds are fire_4 and dismiss_v_4 because these belong to the only set of word senses which are subsumed by remove_v_2 in the WordNet hierarchy.

SUMMARY OF THE INVENTION

According to a first aspect of the invention, there is provided a method of disambiguating first and second words occurring in a first predetermined syntactic relationship, comprising the steps of:

(a) forming a plurality of first sets, each of which comprises: a first subset containing a plurality of senses of the first word; and a second subset containing a plurality of first word senses which are capable of being in the first predetermined syntactic relationship with the first word and which have semantically similar senses, (b) forming a plurality of second sets, each of which comprises: a third subset containing a plurality of second word senses which are capable of being in the first predetermined syntactic relationship with the second word and which have semantically similar senses; and a fourth subset containing a plurality of senses of the second word, and (c) selecting an output set comprising each sense of the first word and each sense of the second word which senses occur together in at least one of the first sets and in at least one of the second sets.

According to a second aspect of the invention, there is provided a system for disambiguating first and second words occurring in a first predetermined syntactic relationship, the system comprising a data processor programmed to perform the steps of (a) forming a plurality of first sets, each of which comprises: a first subset containing a plurality of senses of the first word; and a second subset containing a plurality of first word senses which are capable of being in the first predetermined syntactic relationship with the first word and which are semantically similar senses, (b) forming a plurality of second sets, each of which comprises: a third subset containing a plurality of second word senses which are capable of being in the first predetermined syntactic relationship with the second word and which have semantically similar senses; and a fourth subset containing a plurality of senses of the second word, and (c) selecting an output set comprising each sense of the first word and each sense of the second word which senses occur together in at least one of the first sets and in at least one of the second sets.

The term "syntactic relationship" is a general term for concepts such as "subject of", "predicate of", "object of", "adverb of" which describe the grammatical links between words occurring next to one another or within the same phrase, clause or sentence. For example, two syntactic relationships occur in the sentence "Edgar types quickly". A "predicate subject" relationship links the very "types" to the noun "Edgar". A "predicate-adverb" relationship links the verb "types" to the temporal adverb "quickly".

It is thus possible to provide a method and system which are capable of disambiguating, for instance, syntactic word collocates, i.e. words which occur next to each other and which are in a syntactic relationship. Disambiguation occurs with a high degree of reliability and may be used to provide a look-up table permitting subsequent disambiguation by performing a conventional type of look-up procedure.

Preferably the first and second words occur in the first predetermined syntactic relationship in a sample of text, at least some of the words whose senses are contained in the second subset occur in the first predetermined syntactic relationship to the first word in the sample of text, and at least some of the words whose senses are contained in the third subset occur in the first predetermined syntactic relationship to the second word in the sample of text. By analysing a sample of text which may comprise very large quantities of text, disambiguation may be related to the specific language and its usage within the text sample. For instance, the sample of text may comprise a plurality of subsamples relating to subjects sharing a common terminology. This permits disambiguation of word collocates which are specific to or typical of a particular subject, for instance contained in specific sublanguage domains such as legal, financial or medical domains.

Preferably the steps (a) to (c) are repeated for all first and second words occurring in the first predetermined syntactic relationship in the sample of text. For instance, the first predetermined syntactic relationship may involve verb-object word pairs or collocates so that all verb-object collocates are disambiguated. Thus, disambiguation of all word collocates in the first predetermined syntactic relationship can be achieved.

The steps (a) to (c) may be repeated for at least one further predetermined syntactic relationship. Other such relationships include verb-subject and adjective-noun collocates. Thus, the text sample may be used to maximise the disambiguation of all multiple word collocates or groups having all possible syntactic relationships.

The steps (a) to (c) may be repeated for a plurality of first and second word pairs and the union may be formed of all the output sets where the senses of the first words are synonymically related or semantically similar and the senses of all the second words are synonymically related or semantically similar. This allows clusters of synonyms to be formed so as to increase the effective disambiguation capability.

Two words are "synonymically related" if they have equivalent meaning i.e. they are synonyms. For example, the words "gun" and "pistol" are synonymically related as they can be used to refer to the same object. Synonymic links between words are usually given in thesaurus entries.

Thus, the notion of semantic similarity is used to disambiguate, for instance, word pairs with reference to the syntactic context in which they occur, such as verb-noun pairs standing in verb-object or verb-subject relationship. This differs from the techniques disclosed in the papers by Resnik referred to hereinbefore where semantic similarity is merely used to disambiguate clusters of words which have the same part of speech, such as groups of nouns.

BRIEF DESCRIPTION OF THE DRAWINGS

The invention will be further described, by way of example, with reference to the accompanying drawings, in which.

DETAILED DESCRIPTION

Like reference numerals refer to like parts throughout the drawings.

A method constituting a preferred embodiment of the invention for automatically disambiguating syntactically related word pairs is illustrated by the flow diagrams of FIGS. 1 to 5. This embodiment makes use of word senses in the WordNet lexical database which was mentioned hereinbefore and an extract of which is illustrated by the following Table:

| word | POS | sense | definition and/or example |
|---|---|---|---|
| fire | verb | 1 | open fire |
| | | 2 | fire a gun; fire a bullet |
| | | 3 | of pottery |
| | | 4 | give notice |
| | | 5 | The gun fired |
| | | 6 | call forth; of emotions, feelings and responses |
| | | 7 | They burned the house and its diaries |
| | | 8 | provide with fuel; Oil fires the furnace |
| gun | noun | 1 | a weapon that discharges a missile esp from a metal tube or barrel |
| | | 2 | large but transportable guns |
| | | 3 | a pedal or hand-operated lever that controls the throttle; he stepped on the gas |
| clerk | noun | 1 | keeps records or accounts |
| clerk | noun | 2 | a salesperson in a store |

This Table gives partial examples of dictionary entries omitting synonymic links. POS stands for "part of speech" and the integers in the "sense" column are indices referring to specific word uses. In order to extract word senses from the WordNet lexical database, an input such as:

<fire_v, clerk_n> may be supplied, where the input comprises a set containing the words "fire" and "clerk" together with abbreviations "v" and "n" which specify the parts of speech as "verb" and "noun", respectively. The output from the database is of the form <{fire_v_4}, {clerk_n_1, clerk_n_2}> which comprises a set having two subsets and the integers succeeding the abbreviations indicating the parts of speech refer to word senses in the lexical database. Thus, the accessing of the WordNet lexical database determines that, for the word pair comprising "fire" as a verb and "clerk" as a noun, "fire" is used as a verb in the fourth sense and "clerk" is used as a noun in its first or second sense.

Figure 1:
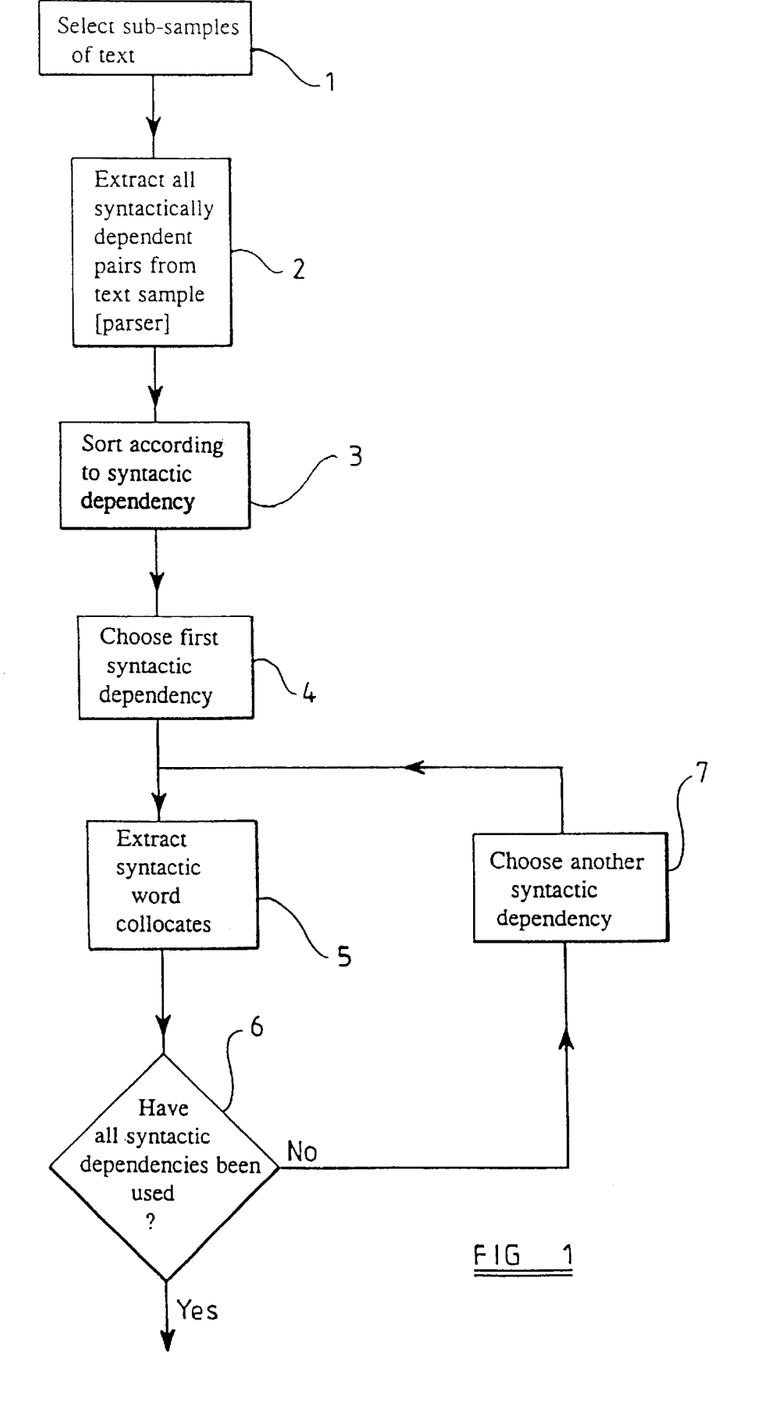
FIG. 1 is a flow diagram illustrating a first part of a method of disambiguation constituting an embodiment of the present invention.

As shown in FIG. 1, subsamples of text are selected at 1 so that disambiguation may be directed to a particular subject matter such as legal, financial, or medical subject matter. It is assumed that the relevant text is already in machine-readable form so that step 1 may comprise an editing step so as to tune the disambiguation towards a particular subject matter where the subsamples make use of the same terminology.

At 2, all syntactically dependent pairs are extracted from the text sample, for instance using a robust parser of known type. For instance, the parser extracts and labels all verb-object pairs, all verb-subject pairs, and all adjective-noun pairs. These word pairs are sorted according to the syntactic dependencies at 3 and a first syntactic dependency, such as verb-object, is chosen at 4.

Syntactic word collocates are extracted at 5 and a step 6 checks whether all syntactic dependencies have been used. If not, another syntactic dependency is chosen at 7 and the step 5 is repeated until all syntactic dependencies have been used.

Figure 2:
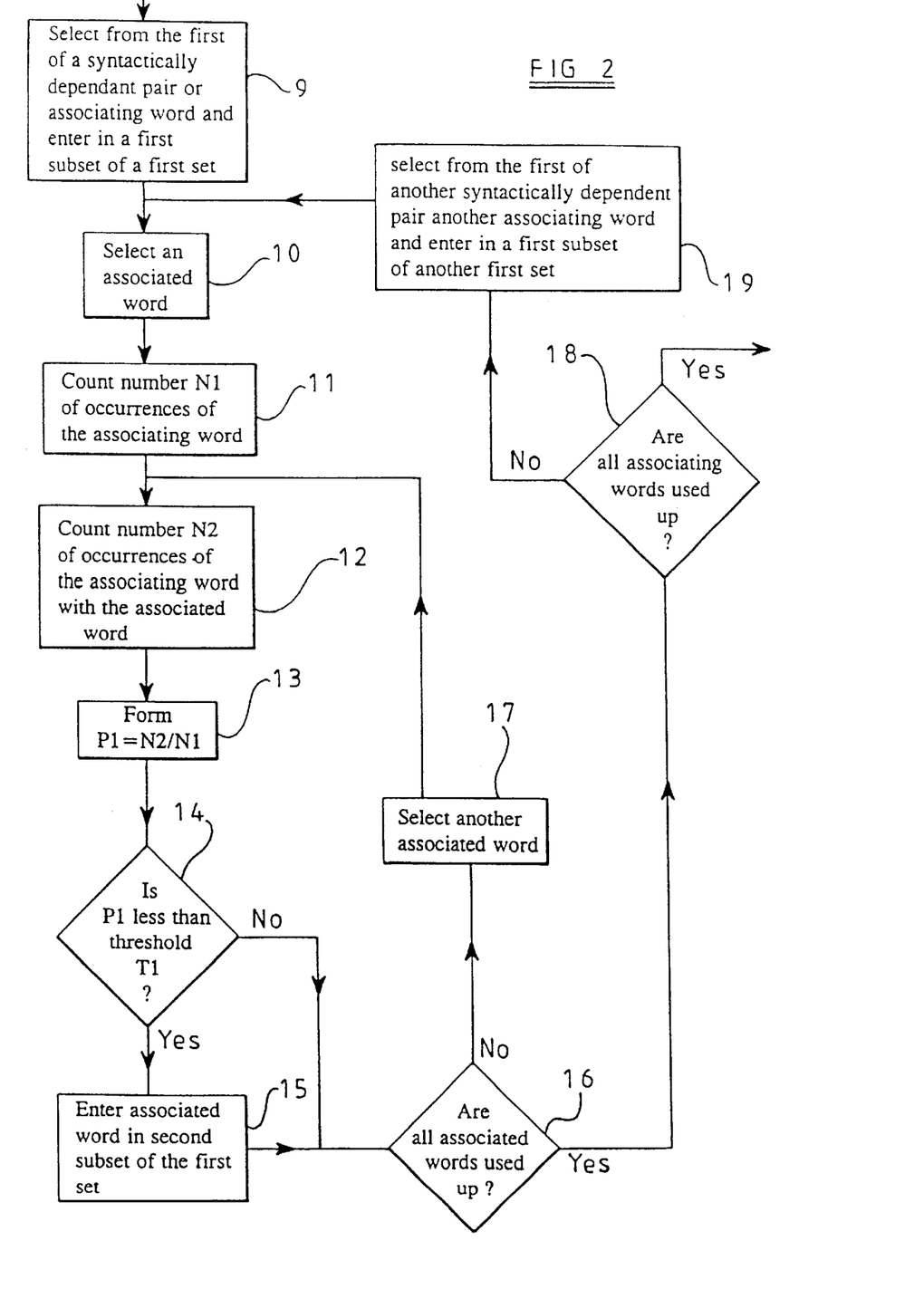
FIGS. 2 and 3 are flow diagrams illustrating in more detail one of the steps of the part of the method shown in FIG. 1.
Figure 3:
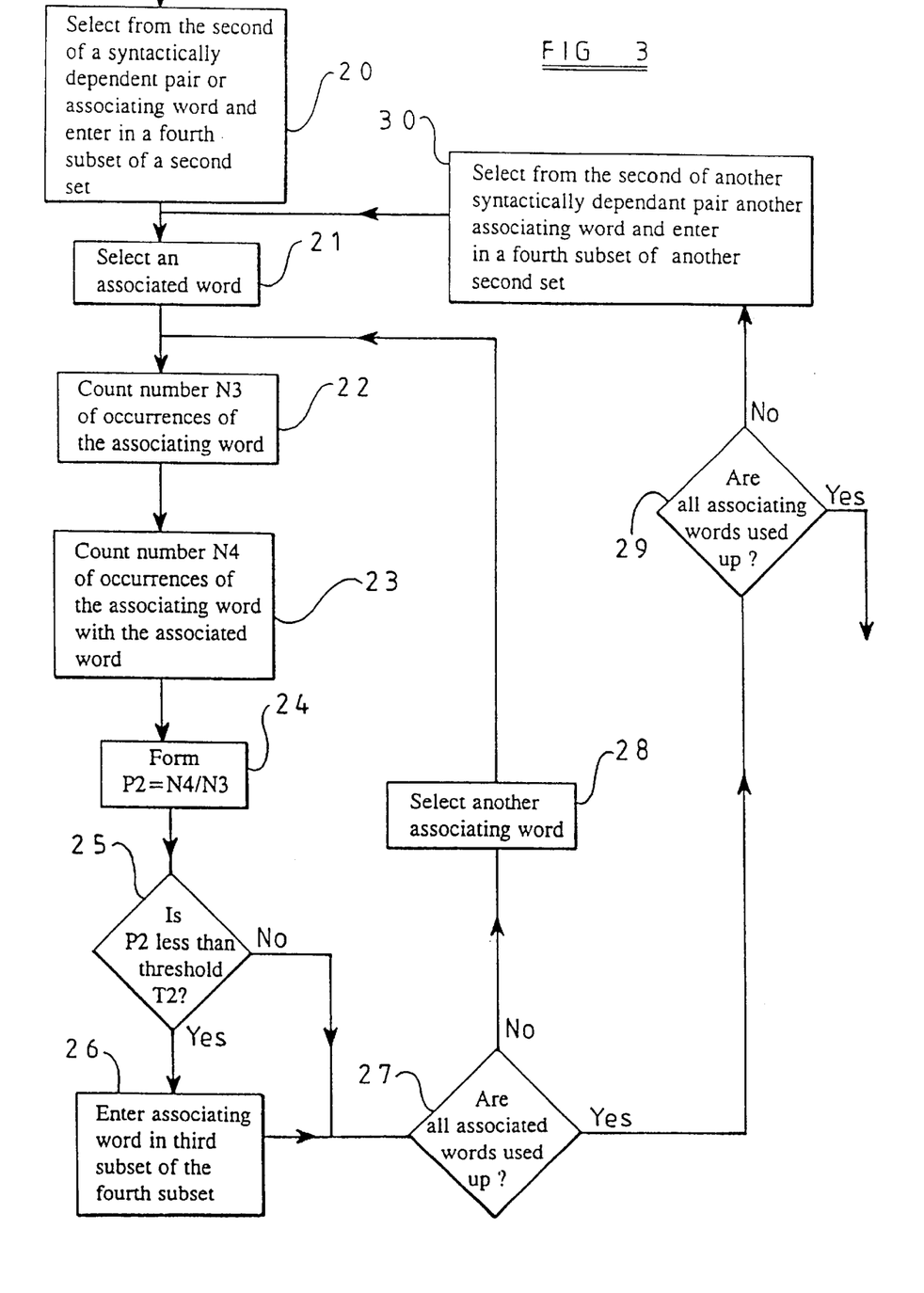

The step 5 is illustrated in detail in FIGS. 2 and 3. At 9, an associating word is selected from the first of a syntactically dependent pair of words and is entered in a first subset of a first set. For instance, the associating word "employee" as an object of a verb may be chosen as the associating word. At 10, an associated word is selected. In particular, the step 10 selects a verb which appears in the verb-object syntactic dependency with "employee" as the object in the text sample. At 11, the number N1 of occurrences of the associating word as the object of a verb in the text sample is counted. At step 12, the number N2 of occurrences of the associating word as the object of the associated word is counted in the text sample. At step 13, the conditional probability P1 for the verb (for instance "fire") given the noun ("employee") in the text sample is calculated as N2/N1.

Step 14 compares the conditional probability with a threshold T1 which represents the threshold for inclusion in the set of statistically relevant associated words for the associating word ("employee"). The threshold T1 for statistical relevance can be either selected manually or determined automatically as the most ubiquitous conditional probability value. Suppose, for example, T1 is to be computed automatically with reference to the conditional probabilities for the following associated verbs of employee:

<fire_v/.25, employee_n>

<dismiss_v/.223, employee_n>

<hire_v/.27, employee_n>

<recruit_v/.22, employee_n>

<attract_v/.02, employee_n>

<be_v/.002, employee n>

<make_v/.005, employee_n>

<affect_v/.01, employee_n>

This can be obtained by distributing all probabilities over a ten-cell template, where each cell is to receive progressively larger values starting from a value greater than 0.01 e.g.

| FROM | TO | VALUES |
|---|---|---|
| >0.01 | .1 | .01, .02 |
| >.1 | .2 | — |
| >.2 | .3 | .25, .333, .27, .22 |
| >.3 | .4 | — |
| >.4 | .5 | — |
| >.5 | .6 | — |
| >.6 | .7 | — |
| >.7 | .8 | — |
| >.8 | .9 | — |
| >.9 | 1 | — |

The lowest value of the cell which has been assigned most elements, which in this case would be 0.22, is selected for T1.

If the conditional probability exceeds the threshold T1, the associated word is entered in the second subset of the first set at 15. Control then passes to step 16 which checks whether all of the words associated with the present associating word have been used up. If not, another associated word is selected at 17 and control returns to the step 12. Once all of the associated words have been used up, step 18 checks whether all associating words as objects of verbs have been used up. If not, step 19 selects from the first of another syntactically dependent pair another associating word and enters it in a first subset of another first set. Control then passes to the step 10.

As a specific example, all of the word pairs occurring in the text sample with "employee" as the object of a verb are as follows <fire_v/, employee_n>

<dismiss_v/, employee_n>

<hire_v/, employee_n>

<recruit_v/, employee_n>

<attract_v/, employee_n>

<be_v/, employee_n>

<make_v/, employee_n>

<affect_v/, employee_n>

The steps 11 to 15 ascribe conditional probability to the associated words and these are indicated as follows <fire_v/.25, employee_n>

<dismiss_v/.223, employee_n>

<hire_v/.27, employee_n>

<recruit_v/.22, employee_n>

<attract_v/.02, employee_n>

<be_v/.002, employee_n>

<make_v/.005, employee_n>

<affect_v/.01, employee_n>

For a threshold T1 of 0.22, only the verbs fire, dismiss, hire and recruit are entered in the second subset of the first set containing "employee" as the first subset so that the first set comprises:

<{fire_v,dismiss_v,hire_v,recruit_v}, employee_n>

Once all of the objects of verb-object pairs have been analysed in this way and given rise to corresponding first sets, the verbs of verb-object pairs are analysed as shown in FIG. 3. Steps 20 to 30 correspond to steps 9 to 19, respectively, but result in a plurality of second sets, each of which corresponds to an associating word in the form of a verb of a verb-object pair and comprises a fourth subset containing the associating word and a third subset of statistically relevant associated words. For instance, the verb "fire" may give rise to verb-object pairs:

<fire_v, gun_n>

<fire_v, rocket_n>

<fire_v, employee_n>

<fire_v, clerk_n>

<fire_v, hymn_n>

<fire_v, rate_n>

As a result of steps 22 to 26, the objects "hymn" and "rate" are not found to be statistically relevant so that the second set is <fire_v, {gun_n,rocket_n,employee_n,clerk_n}> where the fourth subset contains the associating word "fire" as a verb and the third subset contains the associated words gun, rocket, employee, and clerk as nouns.

Figure 4:
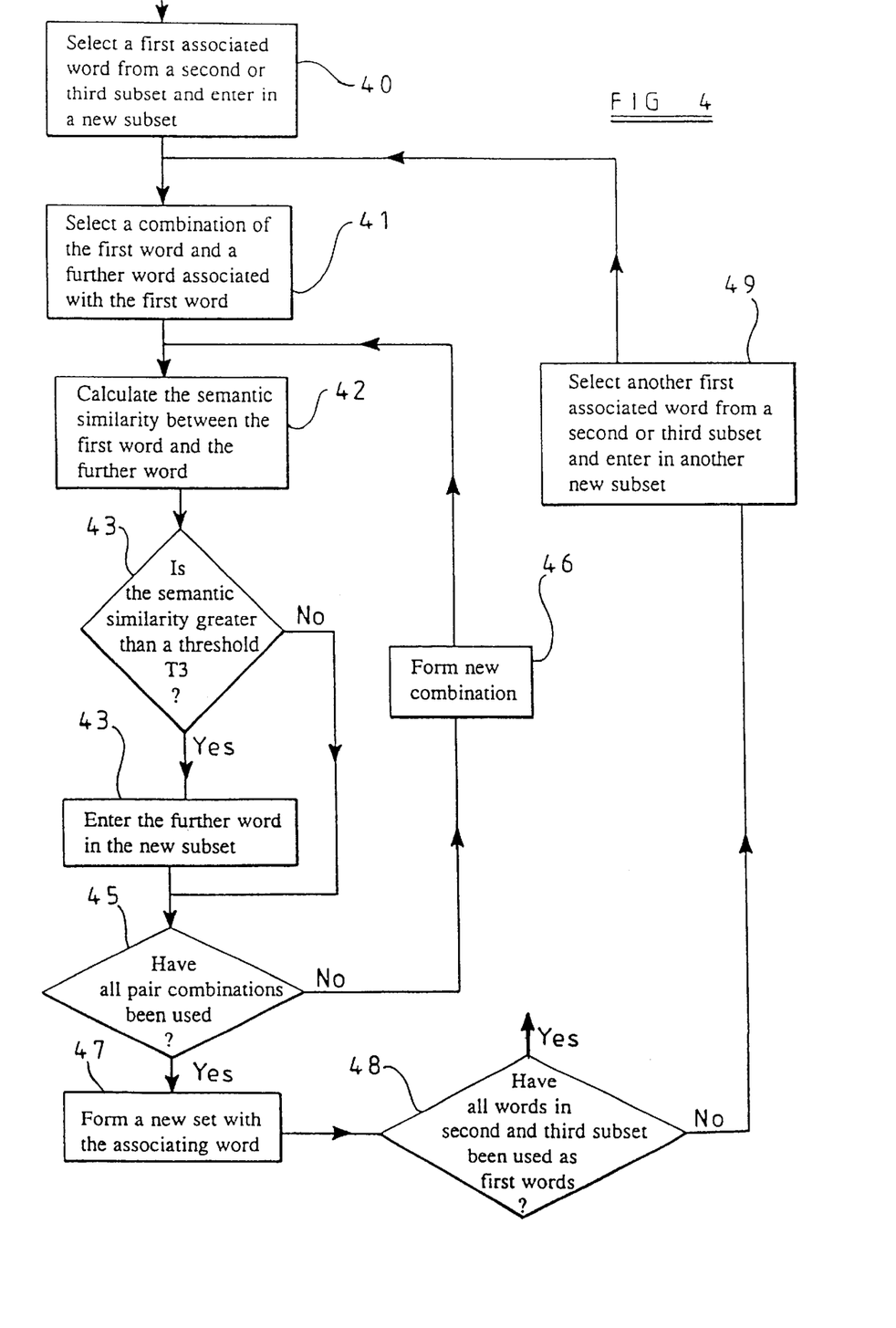
FIGS. 4 and 5 are flow diagrams illustrating the remaining parts of the disambiguating method constituting an embodiment of the invention.

When step 6 in FIG. 1 detects that all syntactic dependencies have been used, control passes to step 40 in FIG. 4. The step 40 selects a first associated word from a second or third subset and enters it in a new subset. Step 41 selects a combination of the first word and a further word which is associated with the first word. For instance, for the first set described hereinbefore and having "employee" as the associating word forming the first subset, the step 40 selects the first associated word "fire" and the step 41 selects "dismiss". Step 42 determines the semantic similarity between these words specifying the similarity as a numerical value. This is then compared with a threshold T3 at step 43 and, if the similarity exceeds the threshold, the further word is entered in the new subset at step 44.

Step 45 assesses whether all pairwise combinations of the associated words in the second or third subset have been used. If not, a new combination is formed at 46 and steps 42 to 45 repeated. Once step 45 determines that all combinations have been used, a new set is formed at step 47 by associating the words remaining in the new subset with the associating word of the first or second set. Step 48 checks whether all words in all of the second and third subsets have been used as first words. If not, step 49 selects another first associated word from a second or third subset and enters it in another new subset. Steps 41 to 47 are then repeated until all of the associated words in the second and third subsets have been used.

These steps thus form all possible unique word pairs with non-identical members out of each associated word subset. For instance, in the case of the associated word subset.

{fire, dismiss, hire, recruit} the following word pairs are formed

{fire-dismiss, fire-hire, fire-recruit, dismiss-hire, dismiss-recruit, hire-recruit}

Similarity, for the associated word subset

{gun, rocket, employee, clerk} the following word pairs are formed

{gun-rocket, gun-employee, gun-clerk, rocket-employee, rocket-clerk, employee-clerk}

The semantic similarities are then assessed, for instance by reference to a thesaurus. For the above two sets of word pairs, the following semantic similarities are obtained:

{[fire_v_4,dismiss_v_4,11],

[fire-hire,0]

[fire-recruit,0]

[dismiss-hire,0]

[dismiss-recruit,0]

[hire_v_3,recruit_v_2,11]}

{[gun_n_1,rocket_n_1,5.008],

[gun_n_3/gun_n_2/gun_n_1,employee_n_1,1.415],

[gun_n_3/gun_n_2/gun_n_1,clerk_n_1/clerk_n_2,1.415],

[rocket_n_3, employee_n_1,2.2555]

[rocket_n_3,clerk_n_1/clerk_n_2,2.255]

[employee_n_i,clerk_n_1/clerk_n_2,4.144]}

In order to determine semantically congruent word senses for the semantic similarities given above, a semantic similarity threshold T3 is established. The semantic similarity threshold T3 can be either selected manually or determined automatically as the most ubiquitous semantic similarity value. As in the case of the threshold T1 for statistical relevance, automatic determination of T3 can be carried out by
1. distributing all semantic similarity scores over an n-cell template, where each cell is to receive progressively larger values starting from a value greater than 0, and then
2. selecting the lowest value of the cell which has been assigned most elements.

In the present case, T3 is manually fixed at 3.

The subsets produced by the step 43 for the example given above are those having a semantic similarity greater than 3 and are as follows {fire_v_4,dismiss_v_4}

{hire_v_3,recruit_v_2}

{clerk_n_1,clerk_n_2,employee_n_1}

{gun_n_1,rocket_n_1}

The resulting new subset therefore contains only words which are semantically related to each other and the step 47 associates each such subset with its associating word to form a new set.

Figure 5:
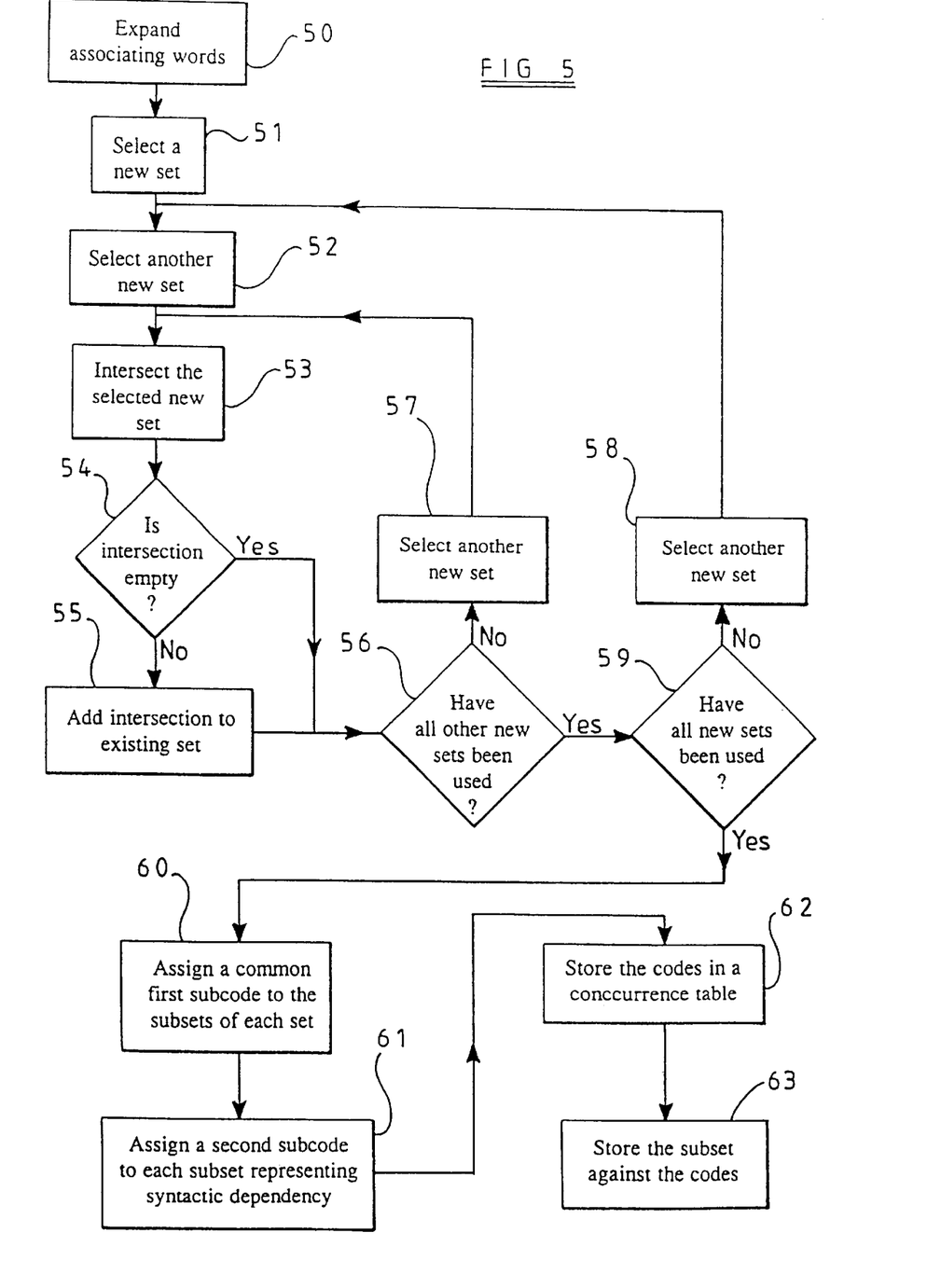

Step 50 shown in FIG. 5 then expands the associating word of each new set into all of its possible senses, for instance by reference to an electronic thesaurus or dictionary. The word senses are included for all of the associated and associating words. For instance, the resulting expanded new sets corresponding to the previous specific example are as follows:

<{hire_v_3,recruit_v_2}, {employee_n_1}>

<{dismiss_v_4,fire_v_4}, {employee_n_1}>

<{fire_v_1,fire_v_2,fire_v_3,fire_v_4,fire_v_5, fire_v_6, fire_v_7,fire_v_8}, {clerk_n_1,clerk_n_2,employee_n_1}>

<{fire_v_1,fire_v_2,fire_v_3,fire_v_4,fire_v_5, fire_v_6, fire_v_7,fire_v_8}, {gun_n_1,rocket_n_1}>

For the associating word "employee", there is only one meaning so that the first subset of each new expanded set comprises "employee_n_1". However, the associating word "fire" has eight possible senses so that the fourth subsets contain each of these eight senses. Thus, each expanded new set has a subset containing associated words which are semantically related to each other and another subset containing all senses of the associating word.

Steps 51 and 52 select two of the expanded new sets and step 53 intersects these two sets. In particular, in the case of verb-object pairs, the subsets of these two new sets containing verbs are intersected and likewise the subsets containing objects are intersected. Thus, the output of the step 53 comprises a new set which is non-empty if the two sets have one or more common members in both the "verb" subsets and the "object" subsets. For the specific example given hereinbefore of the expanded new sets, when the set

[{dismiss_v_4,fire_v_4},{employee_n_1}]

is intersected with the set

[{fire_v_1,fire_v_2,fire_v_3,fire_v_4, fire_v_5,fire_v_6, fire_v_7,fire_v_8}, {clerk_n_1,clerk_n_2,employee_n_1}]

the resulting intersection comprises the set

[{fire_v_4}, {employee_n_1}].

All other pair-wise intersections of the four expanded new sets are empty because there are no verbs and objects common to both sets of each pair-wise combination.

Step 54 determines whether the intersection is empty and, if not, the set formed by the intersection is added to an existing set at 55. The steps 53 and 54 effectively perform the disambiguation, the result of which is merged by step 55 into pairs of semantically compatible word clusters using a thesaurus function and/or the notion of semantic similarity. The word senses contained in the resulting subsets or clusters formed by the step 55 are all semantically similar (possible in synonymic relation) to each other. For instance, the sets:

<fire_v_4, employee_n_1>

<dismiss_v_4, clerk_n_1>

<give_the_axe_v_1, salesclerk_n_1>

<sack_v_2, shop_clerk_n_1>

<terminate_v_4, clerk_n_2> may be merged into the following set

<{fire_v_4, dismiss_v_4, give_the_axe_v_1, sack_v_2, terminate_v_4},

{clerk_n_1, employee_n_1, salesclerk_n_1, shop_clerk_n_1, clerk_n_2}>

Step 56 checks whether all other new sets have been used and thus effectively determines whether all possible intersections with the new set selected at 51 have been formed. If not, another new set is selected at 57 and control returns to the step 53. When all pair-wise combinations including the new set selected in the step 51 have been formed, step 59 checks whether all new sets have been used. If not, step 58 selects another new set and the process is repeated until each expanded new set has been intersected with every other expanded new set.

The results of steps 1 to 59 as described above comprise sets of pairs of semantically congruent word sense clusters, for example such as <{fire_v_4, give_the_axe_v_1, send_away_v_2, sack_v_2, force_out_v_2, terminate_v_4}

{clerk_n_1, employee_n_1, salesclerk_n_1, shop_clerk_n_1, clerk_n_2}>

<{lease_v_4, rent_v_3, hire_v_3, charter_v_3, engage_v_6, take_v_22,recruit_v_2}, {clerk_n_1, employee_n_1, salesclerk_n_1, shop_clerk_n_1, clerk_n_2}>

These results are then stored so that future disambiguation involving any of the word sense associations may be reduced to simple table look-ups. In step 60, a common first subcode is assigned to the clusters or subsets of each set. Step 61 assigns a second subcode to each subset or cluster representing its syntactic dependency. For instance, a first subcode VO may be assigned to each cluster of verbs whereas a second subcode OV may be assigned to each cluster of verb objects. A specific example would be as follows:

<{102_VO, fire_v_4, dismiss_v_4, give_the_axe_v_1, send_away_v_2,sack_v_2, force_out_v_2, terminate_v_4}, {102_OV, clerk_n_1, employee_n_1, salesclerk_n_1, shop_clerk_n_1, clerk_n_2}>

<{103_VO, lease_v_4, rent_v_3, hire_v_3, charter_v_3, engage_v_6, take_v_22, recruit_v_2}, <{103_OV-, clerk_n_1, employee_n_1, salesclerk_n_1, shop_clerk_n_1, clerk_n_2}>

<{104_VO, shoot_v_3, fire_v_1, . . . }, {104_OV, gun_n_1, rocket_n_1, . . .}>

Step 62 stores the codes in a cooccurrence restriction table, for instance of the form:

| | | |
|---|---|---|
| 102_VO | , | 102_OV |
| 103_VO | , | 103_OV |
| 104_VO | , | 104_OV |

Step 63 stores the subsets or clusters against their assigned codes comprising the first and second subcodes. For instance, the orthography and part of speech of each word sense in the clusters may be stored in a table along with the associated sense member and cluster code as follows:

| | | | | | | |
|---|---|---|---|---|---|---|
| fire | , | v | , | 4 | , | 102_VO |
| dismiss | , | v | , | 4 | , | 102_VO |
| . . . | , | . . . | , | . . . | , | . . . |
| clerk | , | n | , | 1 | , | 102_OV |
| employee | , | n | , | 1 | , | 102_OV |
| . . . | , | . . . | , | . . . | , | . . . |
| hire | , | v | , | 3 | , | 103_VO |
| recruit | , | v | , | 2 | , | 103_VO |
| . . . | , | . . . | , | . . . | , | . . . |
| shoot | , | v | , | 3 | , | 104_VO |
| fire | , | v | , | 1 | , | 104_VO |
| . . . | , | . . . | , | . . . | , | . . . |
| gun | , | n | , | 1 | , | 104_OV |
| rocket | , | n | , | 1 | , | 104_OV |
| . . . | , | . . . | , | . . . | , | . . . |

Once the disambiguation procedure is complete, subsequent disambiguation of word pairs or multiples may be achieved by conventional table look-ups using the tables described hereinbefore. For instance, disambiguation of syntactically related words such as [fire_v,employee_n] may be performed by retrieving all of the cluster codes for each word in the pair and creating all possible pairwise combinations, namely:

<102_VO, 102_OV>

<104_VO, 102_OV>

Those code pairs which are not in the table of cooccurrence restrictions are then eliminated to leave:

<102_VO, 102_OV>

The resolved cluster code pairs may then be used to retrieve the appropriate senses for the input word, giving:

<fire_v_4, employee_n_1>

Figure 6:
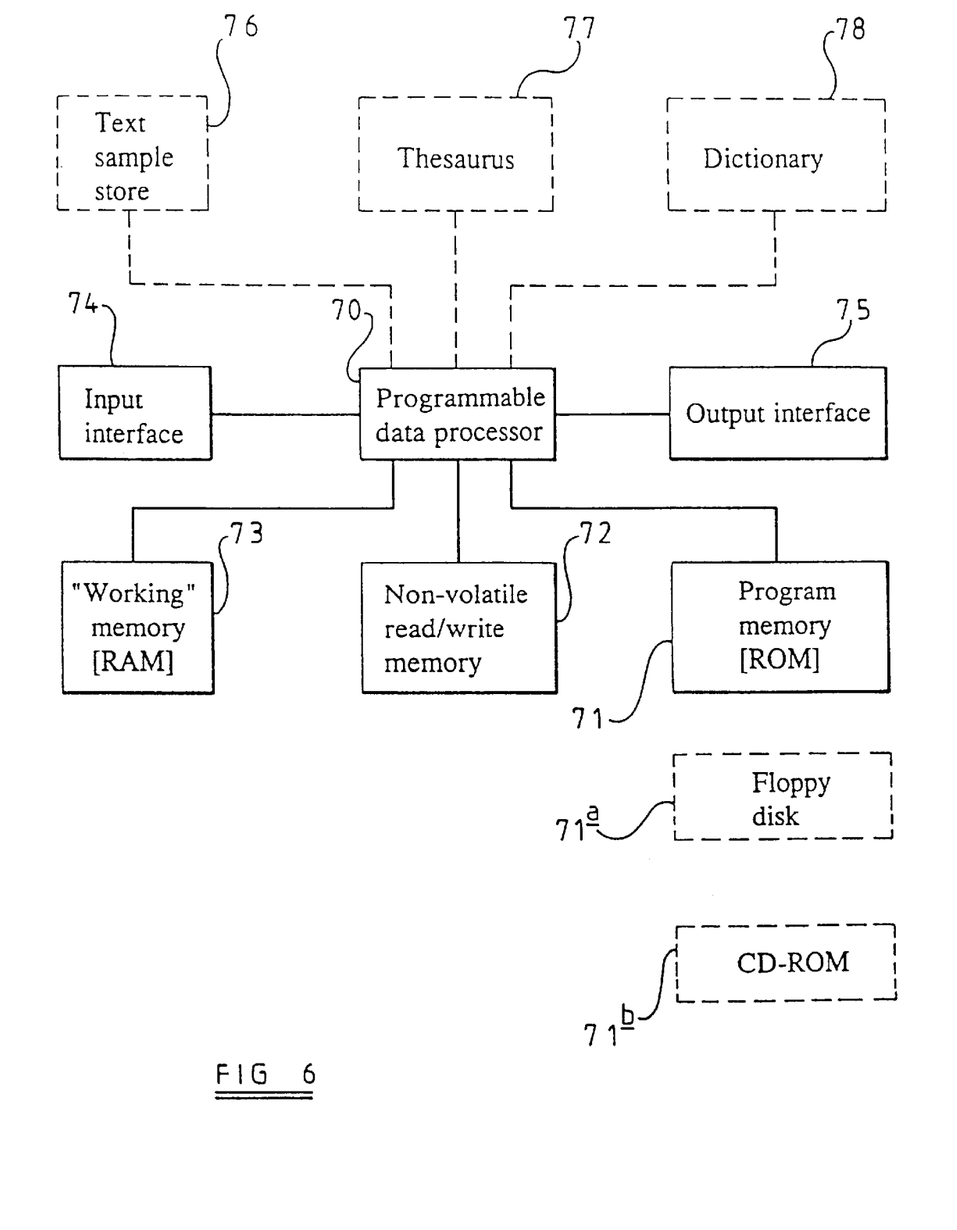
FIG. 6 is a block schematic diagram of a system constituting an embodiment of the invention for performing the method illustrated in FIGS. 1 to 5.

FIG. 6 shows semantically a system suitable for disambiguating word pairs. The system comprises a programmable data processor 70 with a program memory 71, for instance in the form of a read only memory ROM, storing a program for controlling the data processor 70 to perform the method illustrated in FIGS. 1 to 5. The system further comprises non-volatile read/write memory 72 for storing the cooccurrence restriction table and the table of word senses against codes. "Working" or "scratch pad" memory for the data processor is provided by random access memory (RAM) 73. An input reference 74 is provided, for instance for receiving commands and data. An output interface 73 is provided, for instance for displaying information relating to the progress and result of disambiguation.

The text sample may be supplied via the input interface 74 or may optionally be provided in a machine-readable store 76. A thesaurus and/or a dictionary may be supplied in the read only memory 71 or may be supplied via the input interface 74. Alternatively, an electronic or machine-readable thesaurus 77 and an electronic or machine-readable dictionary 78 may be provided.

The program for operating the system and for performing the method described hereinabove is stored in the program memory 71. The program memory may be embodied as semiconductor memory, for instance of ROM type as described above. However, the program may be stored in any other suitable storage medium, such as floppy disc 71a or CD-ROM 71b.

The method described above with reference to FIGS. 1 to 5 can be extended to deal with statistically inconspicuous collocates, that is collocates which do not meet the threshold tests of steps 14 and 25 in FIGS. 2 and 3 respectively. Because, in the method described above, only statistically relevant collocations are chosen to drive the disambiguation process (see step 14), it follows that no cooccurence restrictions might be acquired for a variety of word pairs. This, for example, might be the case with verb-object pairs such as <fire_v,hand_n> where the noun is a somewhat atypical object of the verb, and so does not occur frequently. This problem can be addressed by using the cooccurrence restrictions already acquired to classify statistically inconspicuous collocates, as described below with reference to the verb object pair <fire_v,hand_n>.

First, all verb-object cooccurrence restrictions containing the verb fire are found, which with reference to the example given above are

<102_VO, 102_OV>

<104_VO, 104_OV>

Then all members of the direct object collocate class are retrieved, e.g.

102_→clerk_n_1, employee_n_1

104_→gun_n_1, rocket_n_1

The statistically inconspicuous collocate is then clustered with all members of the direct object collocate class according to semantic similarity, following the procedure described in steps 41–47 of FIG. 4. This will provide one or more sense classifications for the statistically inconspicuous collocate. In the present case, the WordNet senses 2 and 9 (glossed as "farm labourer" and "crew member" respectively) are given when hand_n clusters with clerk_n_1 and employee_n_1, e.g.

IN: {hand_n, clerk_n_1, employee_n_1, gun_n_1, rocket_n_1}

OUT: {{hand_n_2/9, clerk_n_1, employee_n_1}{gun_n_1, rocket_n_1}}

The disambiguated statistically inconspicuous collocate is then associated with the same code of the word senses with which it has been clustered. e.g.,

| hand | n | 2 | 102_VO |
| hand | n | 9 | 102_VO |

This will make it possible to choose senses 2 and 9 for hand in contexts where hand occurs as the direct object of verbs such as fire, in accordance with the above method.

The disambiguation method described above with reference to FIGS. 1 to 5 can occasionally yield multiple results. For example, given the pair of verb and object multiples     <{wear_v, have_on_v, record_v, file_v}{suit_n, garment_n, clothes_n, uniform_n} as the learning data set, the disambiguation of the pair

IN: <wear_v suit_n_1>

May yield the following results

OUT: {<wear_v_1 suit_n_1>, <wear_v_9 suit_n_1>}

Multiple disambiguation results typically occur when some of the senses given for a word in the source dictionary database are close in meaning. For example, WordNet defines sense 1 of wear as be dressed in and sense 9 as putting clothes on one's body.

In order to overcome this problem, multiple word sense resolutions can be ranked with reference to the semantic similarity scores used in clustering word sensed during disambiguation (step 42 of FIG. 4). The basic idea is a word sense resoluting choice represented by a word cluster with a higher semantic similarity score provides a better disambiguation hypothesis. For example, specific word senses for the verb-object pair <wear suit> are given by the following disambiguated word multiples     {<{have_on_v_1, wear_v_1}, {clothes_n_1, garment_n_1, suit_n_1, uniform_n_1}

<{file_v_2, wear_v_9}, {clothes_n_1, garment_1, suit_n_1, uniform_n_1}>}

These arise from intersecting pairs consisting of all senses of an associating word and a semantically congruent cluster of its associated words, as described in relation to steps 50–59 of FIG. 5. Taking into account the semantic similarity scores shown below which are used to derive the sets of associated verbs according to steps 41–47, the best word sense candidate for the verb wear in the context wear suit would be wear_v_1.

As a further extension of the method described above with reference to FIGS. 1 to 5, grammatical properties of words such as transitivity for verbs can be used to facilitate and improve the disambiguation process by reducing the number of sense expansions for the associating word at step 50. For example, in expanding the associating word fire_v in     <fire_v, {clerk_n_½, employee_n_1)> all senses of fire_v pertaining to non-transistive uses of the verb fire as specified in the lexical database (e.g. sense 1 which is defined as open fire) could be excluded as the disambiguating context requires a transistive use of the verb.

What is claimed is:

1. A method of disambiguating first and second words occurring in a first predetermined syntactic relationship, which comprises collocation of the first and second words, the method comprising the sequential steps:

(a) forming a plurality of first sets, each of which comprises: a first subset containing a plurality of senses of the first word and a second subset containing a plurality of word senses which are capable of being in the first predetermined syntactic relationship with the first word and which are semantically similar senses,     (b) forming a plurality of second sets, each of which comprises: a third subset containing a plurality of word senses which are capable of being in the first predetermined syntactic relationship with the second word and which are semantically similar senses; and a fourth subset containing a plurality of senses of the second word, and     (c) selecting an output set comprising each sense of the first word and each sense of the second word in which the senses of the first and second words occur together in at least one of the first sets comprising the first and second subsets and in at least one of the second sets comprising the third and fourth subsets once all pair-wise combinations of associated words in the sets and associated subsets have been used,     wherein the first and second words occur in the first predetermined syntactic relationship which comprises collocation of the first and second words in a sample of text; at least one of the words whose senses are contained in the second subset occur in the first predetermined syntactic relationship which comprises collocation of the first and second words to the first word in the sample of text; and at least one of the words whose senses are contained in the third subset occur in the first predetermined syntactic relationship which comprises collocation of the first and second words to the second word in the sample of text.

2. A method as claimed in claim 1, wherein each of the sequential steps (a) to (c) are repeated for all first and second words occurring in the first predetermined syntactic relationship which comprises collocation of the first and second words in the sample of text.

3. A method as claimed in claim 1, wherein each of the sequential steps (a) to (c) are repeated for at least one further predetermined syntactic relationship which comprises collocation of the first and second words.

4. A method as claimed in claim 1, further comprising:

repeating the sequential steps (a) to (c) for a plurality of first and second word pairs; and     forming a union of all output sets where the senses of the first words are synonymically related or semantically similar and the senses of the second words are synonymically related or semantically similar.

5. A method as claimed in claim 1, further comprising at least one of steps of:

(i) removing statistically inconspicuous word senses from said first subset before carrying out step (c); and (ii) removing statistically inconspicuous word senses from said third subset before carrying out step (c).

6. A method as claimed in claim 5, wherein at least one of said statistically inconspicuous word senses is added to said output set and is placed with one or more words in said output set with which it is semantically similar.

7. A method as claimed in claim 1, wherein, in cases where said output set contains more than one of said first word senses, a preference is given to the first word sense having the greatest semantic similarity with other first word senses.

8. A storage medium containing a program for controlling a programmable data processor to perform a method as claimed in claim 1.

9. A system for disambiguating first and second words occurring in a first predetermined syntactic relationship which comprises collocation of the first and second words, the system comprising a data processor programmed to perform the steps of:

(a) forming a plurality of first sets, each of which comprises: a first subset containing a plurality of senses of the first word and a second subset containing a plurality of word senses which are capable of being in the first predetermined syntactic relationship with the first word and which are semantically similar senses, (b) forming a plurality of second sets, each of which comprises: a third subset containing a plurality of word senses which are capable of being in the first predetermined syntactic relationship with the second word and which are semantically similar senses and a fourth subset containing a plurality of senses of the second word, and (c) selecting an output set comprising each sense of the first word and each sense of the second word in which the senses of the first and second words occur together in at least one of the first sets comprising the first and second subsets and in at least one of the second sets comprising the third and fourth subsets once all pair-wise combinations of associated words in the sets and associated subsets have been used, wherein the first and second words occur in the first predetermined syntactic relationship which comprises collocation of the first and second words in a sample of text; at least one of the words whose senses are contained in the second subset occur in the first predetermined syntactic relationship which comprises collocation of the first and second words to the first word in the sample of text; and at least one of the words whose senses are contained in the third subset occur in the first predetermined syntactic relationship which comprises collocation of the first and second words to the second word in the sample of text.

* * * * *